United States Patent [19]

Agata et al.

[11] Patent Number: 5,708,562
[45] Date of Patent: Jan. 13, 1998

[54] PORTABLE COMPUTER AND A KEYBOARD THEREFOR

[75] Inventors: Hiroaki Agata, Yokohama; Masato Anzai, Machida; Tetsuo Ogawa, Sagamihara; Shigeki Mori, Yokohama, all of Japan

[73] Assignee: International Business Machines Corporation, Armonk, N.Y.

[21] Appl. No.: 665,656

[22] Filed: Jun. 18, 1996

[30] Foreign Application Priority Data

Jun. 29, 1995 [JP] Japan ................. 7-163237

[51] Int. Cl.⁶ ................. G06F 1/16; G09G 5/08
[52] U.S. Cl. ................. 361/683; 361/680; 345/169; 345/161
[58] Field of Search ................. 361/680, 681, 361/683; 400/490, 492, 682, 479, 488; 345/157, 160, 161, 163, 164, 167, 168, 169; 364/708.1, 709.11, 709.01, 709.12

[56] References Cited

U.S. PATENT DOCUMENTS

| 4,605,828 | 8/1986 | Gostomski, Jr. ............... 200/5 A |
| 5,428,355 | 6/1995 | Jondrow et al. ............... 341/20 |
| 5,473,347 | 12/1995 | Collas et al. ............... 345/169 |
| 5,488,392 | 1/1996 | Harris ............... 345/157 |
| 5,504,502 | 4/1996 | Arita et al. ............... 345/160 |
| 5,532,904 | 7/1996 | Sellers ............... 361/680 |
| 5,534,891 | 7/1996 | Takano ............... 345/169 |
| 5,543,787 | 8/1996 | Karidis et al. ............... 341/20 |
| 5,546,334 | 8/1996 | Hsieh et al. ............... 364/709.11 |

FOREIGN PATENT DOCUMENTS

| 0235733 | 2/1987 | Germany ............... G06F 1/00 |
| 0725329 | 1/1996 | Germany ............... G06F 1/16 |

OTHER PUBLICATIONS

Patent Abstracts of Japan, vol. 95, No. 007, 8/31/95, JP-A-07 093092, Canon Inc. 4/7/95.
Patent Abstracts of Japan, vol. 017, No. 084, (P-1490), 2/19/93, JP-A-04 284526 (Canon Inc.) 10/9/92.
European Search Report EP 96 30 4733.
European Search Report EP 96 30 0730.
European Search Report EP 87 10 2638.
IBM Technical Disclosure Bulletin, Sep. 1982, pp. 1978,79.
IBM Technical Disclosure Bulletin, Dec. 1984, pp. 3952,53.

Primary Examiner—Leo P. Picard
Assistant Examiner—Lynn D. Feild
Attorney, Agent, or Firm—James E. Murray; Stephen S. Strunck

[57] ABSTRACT

A portable PC is provided with a mechanism for elevating and lowering a pointing device in the keyboard of the PC. The elevating and lowering mechanism elevates and lowers the pointing device in response to the opening and closing of the cover of the computer to provide a proper operating height to the pointing device when the cover is open while reducing the thickness of the PC with the cover closed.

12 Claims, 7 Drawing Sheets

PORTABLE COMPUTER AND A KEYBOARD THEREFOR

FIELD OF THE INVENTION

The present invention relates to portable personal computers (PC's) and their keyboards, and more specifically, to a means for elevating and lowering a pointing device for a portable PC.

DESCRIPTION OF THE BACKGROUND

The IBM Trackpoint pointing device ("Trackpoint" is a trademark of IBM Corp.), disclosed in Japanese Patent Application No. Hei 7-23189 (IBM Company Reference No. RA993060) and incorporated herein by reference, is one of the pointing devices frequently employed with portable PCs such as notebook PCs. To facilitate its use, the pointing device is designed to stand 1 to 2 mm higher than the keys on the keyboard of the portable PC. However, when the cover of the portable is closed, contact with the screen for the portable PC by the upstanding manipulated end of the pointing device can damage the screen. In order to avoid this contact with the screen, the gap between the screen and the keyboard, in portable PCs containing a pointing device, must be larger than in those that contain no such pointing device. This increase in the size of the gap results in about a 125 $cm^3$ increase in the volume of a full sized notebook PC, such as a ThinkPad 755CX ("ThinkPad" is a trademark of IBM Corp.), and about 100 $cm^3$ increase of volume of a sub-sized notebook PC, such as a ThinkPad 701C. The increase in the size of the PC is accompanied by an increase in weight of the PC case. This increase in size and weight is very undesirable in portable PC's that are intended to be compact and light.

IBM TECHNICAL DISCLOSURE BULLETIN (TDB), Vol. 33, No. 9, Feb 1991, pp 428 to 430 discloses a cursor key that can be locked in a lower position to inactivate the key and activate a trackball contained in the key.

SUMMARY OF THE PRESENT INVENTION

According to the present invention, a pointing device that is located among the keys of the keyboard of a portable PC includes a means for elevating and lowering the pointing device so that its manipulated or operated end is above the keys when the portable PC is to be used, and below the keys when the portable PC is not to be operated. The elevating and lowering means for the pointing device can be means to convert, into the movement of the pointing device, an operation that is associated with the activation of the portable PC, such as the opening/closing of the cover or the turning on/off of a power switch. Alternatively, it can use an operation performed specifically for the elevating and the lowering of the pointing device.

In the three disclosed embodiments of the present invention, the pointing device is elevated and lowered by interaction with the opening and closing of the cover for the portable PC. In one embodiment, the elevating and lowering means includes a hinged base portion to which the base end of a pointing device is fixed, and an arm portion that pivots the base portion in response to the opening and closing of the cover to elevate and lower the pointing device.

In another embodiment of the present invention, the elevating and lowering means includes a carrier for a pointing device which slides on a sloped surface in response to the opening and the closing of a cover to elevate and lower the pointing device.

In an additional embodiment of the present invention, the keyboard is divided into sections that shift into an operating position when the cover is opened. The base portion containing the pointing device is joined to one of the keyboard sections by a hinge so that the base portion interacts with the movement of the keyboard section to elevate and lower the pointing device.

Therefore one object of the present invention is to provide a portable PC with a pointing device of the appropriate size and weight, while providing excellent usability and durability.

It is a further object of the present invention to provide a pointing device that moves into operational position only when the portable PC is readied for use.

Another object of the present invention is to provide a pointing device that moves in and out of its operational position in response to the opening and closing of the cover of a portable PC.

BRIEF DESCRIPTION OF THE DRAWINGS

These and other objects of the present invention can best be understood by reading the description of the preferred embodiments of the invention while referring to the accompanying figures of which.

DESCRIPTION OF THE PREFERRED EMBODIMENTS

Figure 1:
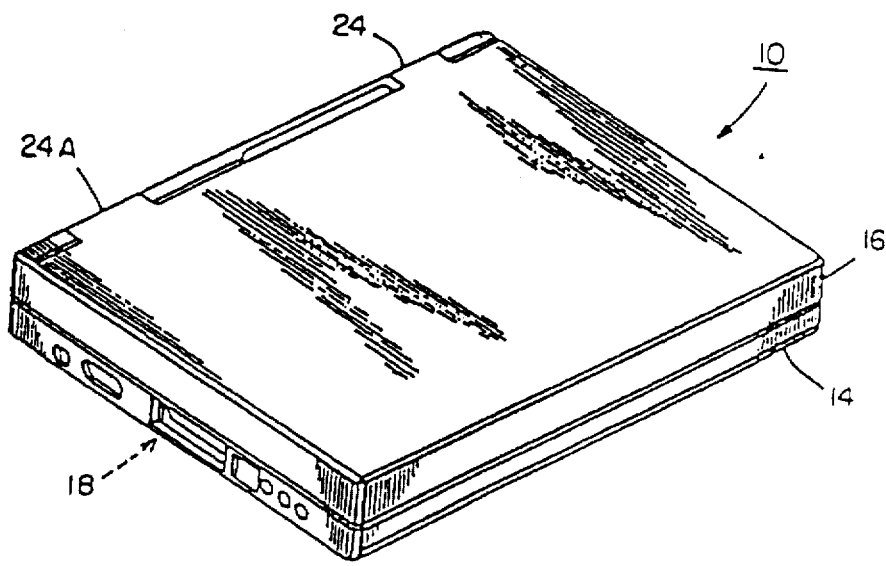
FIG. 1 is a perspective view of a portable PC, with its cover closed.
Figure 2:
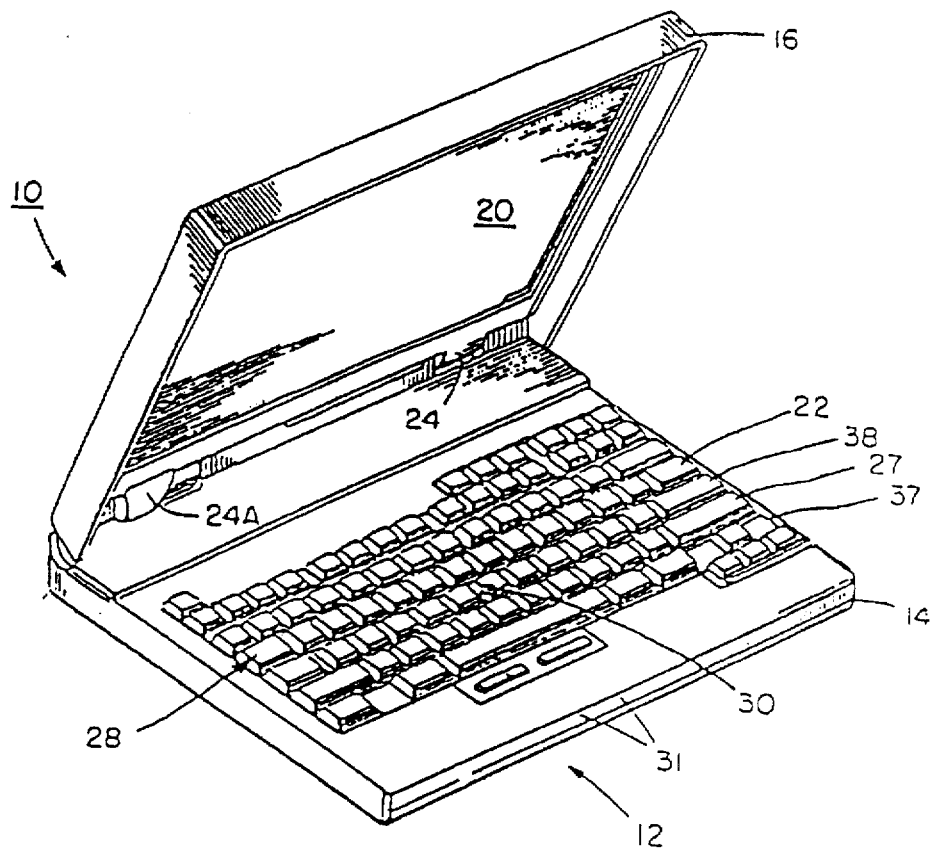
FIG. 2 is a perspective view of the portable PC shown in FIG. 1 with its cover partly opened.

Referring to FIGS. 1 and 2, computer 10 comprises a lower case 14, a cover 16, an electronic circuit 18 in the lower case 14 and a display 20 in the cover. The cover 16 is mechanically and electrically attached to the base 14 at pivot joints 24 and 24A, so that the cover 16 can pivot between the closed position shown in FIG. 1 through the partially opened position shown in FIG. 2, to a fully opened position (not shown). The display 20, such as a liquid crystal display (LCD) screen, is mechanically connected to the inner side of the cover 16 and is electrically connected to the electronic circuit 18. The electronic circuit 18 is stored within the lower case 14 or within the cover 16, or partially stored within both of them. The electronic circuit 18 includes an electronic processor and electronic memory.

Figure 3:
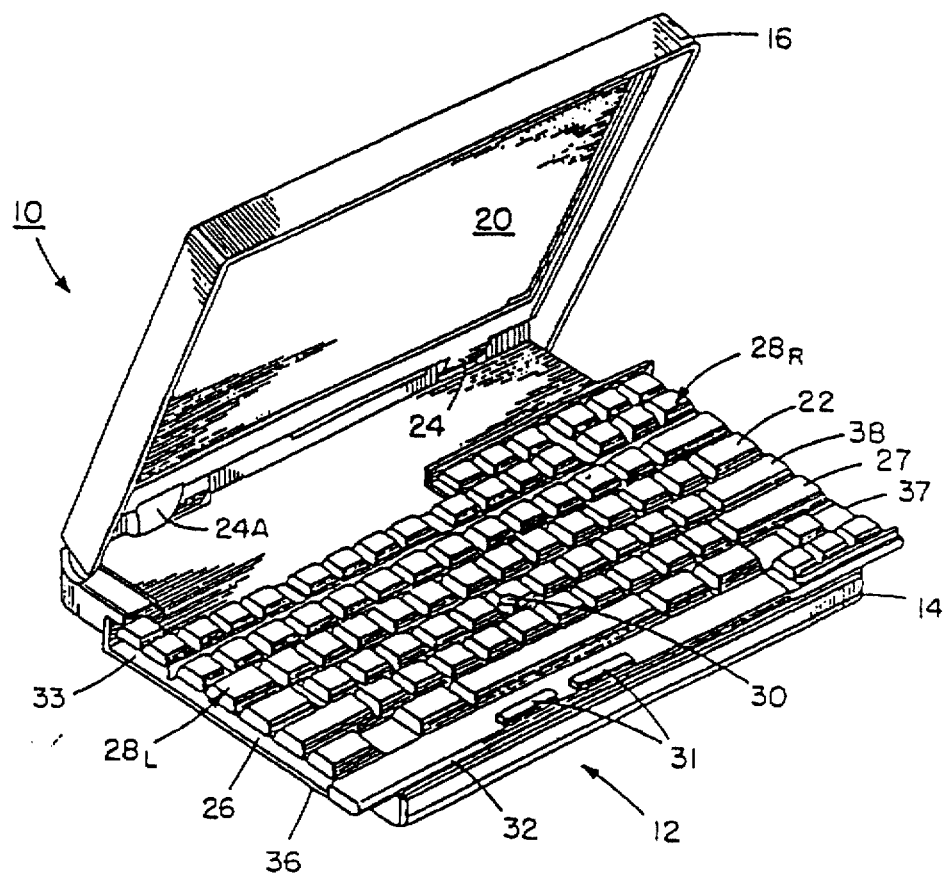
FIG. 3 is a perspective view of a portable PC in another embodiment of the present invention with its cover partly opened.

A pointing device 30 is shown in FIGS. 2 and 3 in its elevated position. The pointing device 30 is electrically connected to the electronic circuit 18. In FIGS. 1 and 2 the present invention is shown applied to the ThinkPad 755 CX (a full-sized notebook PC), which went on sale in Japan in May, 1995. In FIG. 3, the present invention is shown applied to the ThinkPad 701C, which is a sub-notebook PC that went on sale in Japan in May, 1995. In the embodiment shown in FIG. 3, a computer 10 has a keyboard assembly 22 that can be rearranged.

Figure 4:
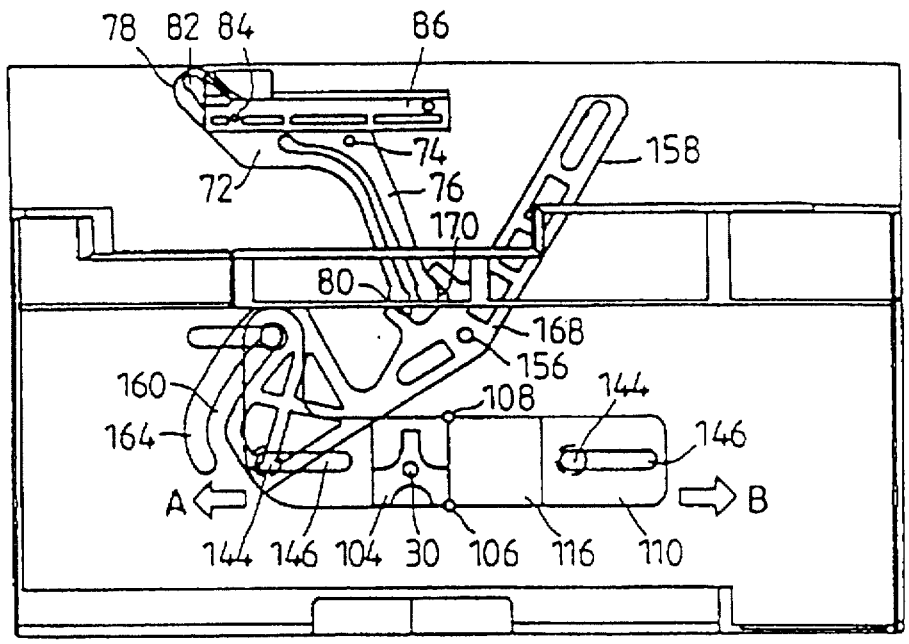
FIG. 4 is a schematic top plan view of the portable PC in FIG. 2 with the elevating and lowering mechanism shown in full in its position when the cover is closed.
Figure 5:
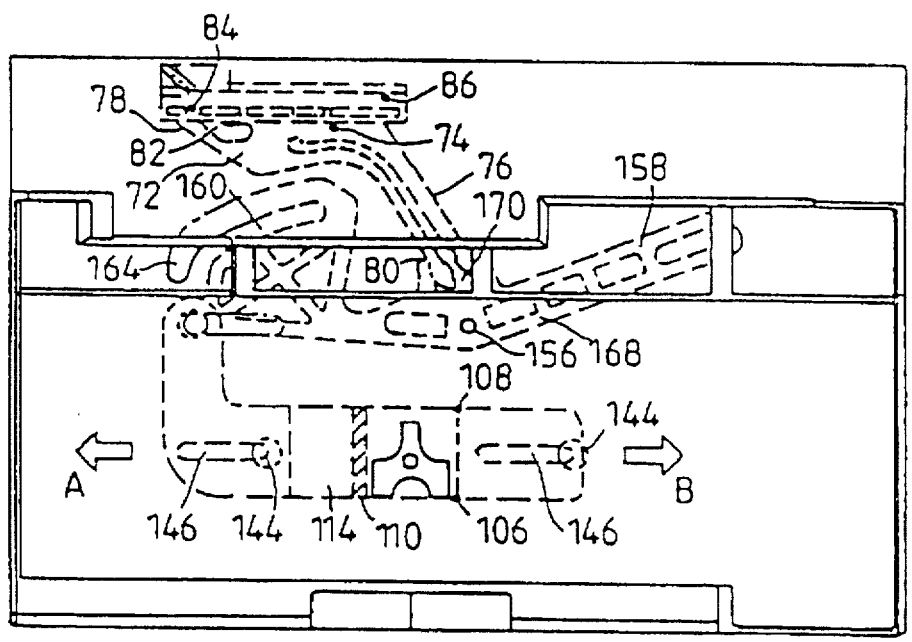
FIG. 5 is a schematic top plan view of the portable PC in FIG. 2 with the elevating and lowering mechanism shown in phantom in its position when the cover is open.

An elevating and lowering mechanism for a portable PC according to the first embodiment of the present invention will now be described while referring to FIGS. 4 and 5. The mechanism automatically elevates and lowers the operating end for a pointing device in concert with the relative position of the cover 16 of the case. A first drive arm 158 in this embodiment has an end portion 164, in which is formed a guide slot 160, and a central connection area 168, in which is formed a socket area 170. The central connection area 168 is held to the lower case 14 by a pivot pin 156 around which it pivots. The guide slot 160 is formed in an appropriate shape so that in conjunction with a clearance slot 146 it can provide a desired operation of an arm 110 in the case. The base portion 104, which fixes in place the pointing device 30, is connected at the right side to the keyboard 26 by means of the hinges 106 and 108. An opening is contained in the keyboard 26 to permit the operated end of the pointing device 30 to extend upward. The elevating and lowering mechanism in this embodiment includes a second drive arm 72. The second drive arm 72 is installed on the system 12 and is held by a pivot 74 so that it freely pivots. The second drive arm 72 has a first end portion 76 and a second end portion 78. At the distal end of the first end portion 76 is formed a ball section 80 that is inserted into the socket 70 in the first drive arm 158 so as to set it in the operating state. In the second end portion 78 is formed a cam slot 82 with a cam pin 84 inserted therein. The cam pin 84 reduces the influence of friction and provides a smoother operation in the slot 82.

Figure 13:
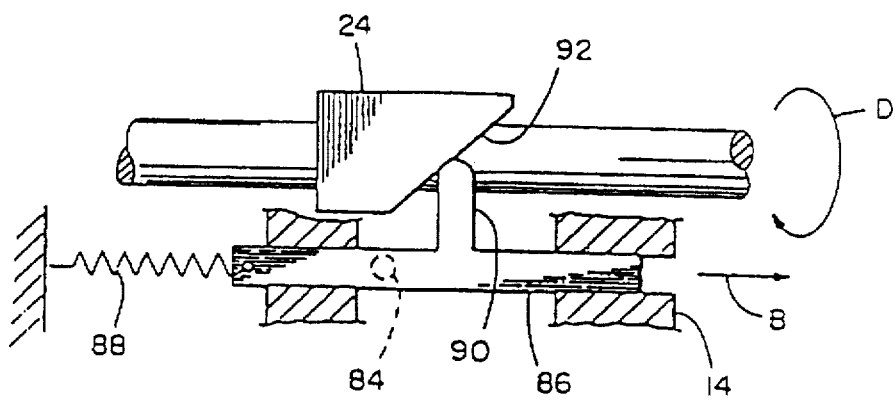
FIG. 13 is a schematic plan view of one part of the elevating and lowering mechanism shown in FIGS. 4, 5, 9, and 10 that controls the movement of a pallet based on the position of a cover relative to a base.

Referring to FIG. 13, the cam pin 84 is extended downward from a cam slider 86. The cam slider 86 is so installed in the system 12, parallel to the rotary shaft of the cover 16, that it is slidable. The cam slider 86 is biased to the left by a tension spring 88. On the cam slider 86 is a rider section 90 that contacts a cam surface 92 of the left pivot joint 24A (see FIG. 3), by which the cover 16 is attached to the system 12. When the cover 16 is to be pivoted and thus closed from the opened position, the pivot joint 24A rotates as is indicted by the arrow D. Then, the cam surface 92 is driven against the rider section 90, the cam slider 86 is shifted to the right, as is indicated by the arrow B, and the tension spring 88 is stretched. When the cover 16 is to be pivoted from the closed position to the open position, the pivot joint 24A rotates the opposite direction. The tension spring 88 pulls the cam slider 86 in the direction that is the opposite of the direction B as the rider section 90 moves along the cam surface 92 to place the keyboard in the operating position. The force that is exerted to arrange the keyboard is only the force that is generated by the tension spring 88. This structure protects the internal mechanism when the extension of a pallet is interrupted in a third embodiment, which will be described later. This arrangement is therefore preferable for driving the cam slider 86 directly into the cover at the extended operating position.

A shifting mechanism, and the movement of the pallet from the storage position to the operating position will now be described. In FIG. 4 is shown an elevating and a lowering mechanism at the storage position. In this embodiment, the first drive arm 158 is so held by the pivot pin 156 that it can be pivoted. On the first drive arm 158 is the end portion 164 in which is formed the guide slot 160, and the central connection area 168 in which is formed the socket area 170. The central connection area 168 is so fitted around the pivot pin 156 that it can be freely pivoted.

As is described above, in FIG. 4 is shown the storage positions of the components when the cover 16 is closed. In this condition, the cam slider 86 and the cam pin 84 are positioned completely to the right by the cam surface 92 of the pivot joint 24A, which acts on the rider section. In the illustration in FIG. 5, which is a schematic diagram, as is in FIG. 4, are depicted components when the cover 16 is pivoted and opened. As is apparent from the comparison of the diagrams in FIGS. 4 and 5, the cam pin 84 is shifted to the left. Thus, the second drive arm 72 pivots as is indicted by the arrow E because the center section of the cam slot 82 is formed with an angle. Since the pivot 74 is fixed to the base 14, the first end portion 76 of the second drive arm 72 rotates the first drive arm 158 in the direction F. Due to the interaction with the guide slot 160 for the first drive arm 158, the arm 110 is driven by the first drive arm 158 in the horizontal direction indicated by B. The first drive arm 158 pivots around the pivot pin 156, while the ball section 80 of the second drive arm 72 pivots within the socket area 70 in the first drive arm 58.

Figure 6:
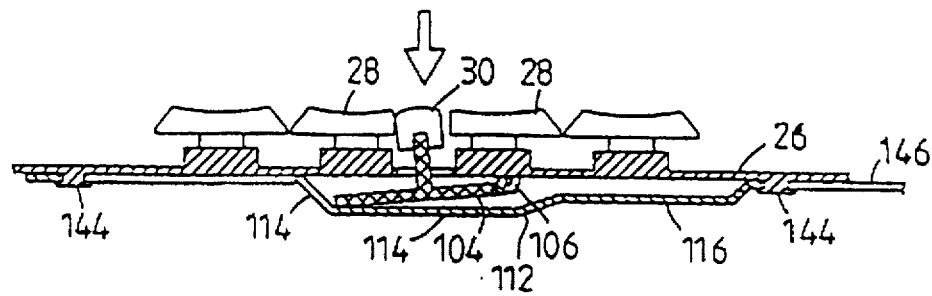
FIG. 6 is a cross sectional view of the portable PC shown in FIG. 2 with the pointing device in its position with the cover closed.
Figure 7:
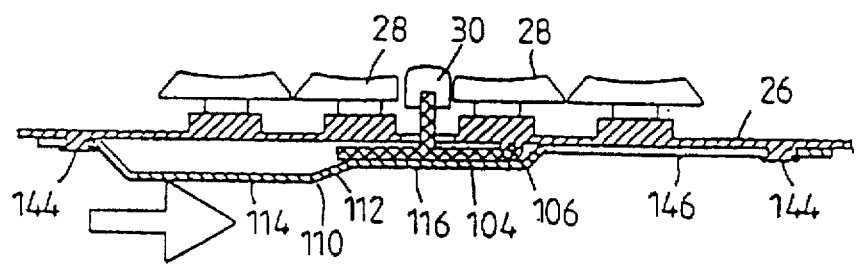
FIG. 7 is a cross sectional view of the portable PC shown in FIG. 2 with the pointing device in its position with the cover opened.

As is shown in FIGS. 6 and 7, as the arm 110 is shifted in the horizontal direction A, the base portion 104 is driven upward by a second shelf portion 116 via a sloped portion 112, and the operating section of the pointing device 30 is lifted. It is preferable that a positioner, such as a leaf spring, or an indentation that corresponds in shape to the base portion 104, be provided for the second shelf portion 116 in order to prevent the pointing device from wobbling while it is being manipulated. It is desirable that a Trackpoint have a mechanical failure load that is greater than approximately 3.624 Kg (8 pounds). Although, in the first embodiment the base portion 104 is connected to the keyboard 26 by means of the hinges 106 and 108, a flexible member, such as a compression coil spring or a leaf spring, can be employed to connect the base portion 104 to the keyboard 26.

The shifting of the pallet from the storage position to the operating position has been explained. To move the pallet from the operating position to the storage position, a user merely closes the cover. The elevating and lowering mechanism then automatically moves the arm 110 inversely. As the arm 110 is shifted in the horizontal direction B, the base portion 104 is moved to the first shelf portion 114 across the sloped portion 112, and as a result, the operating section of the pointing device 30 is lowered.

Figure 8:
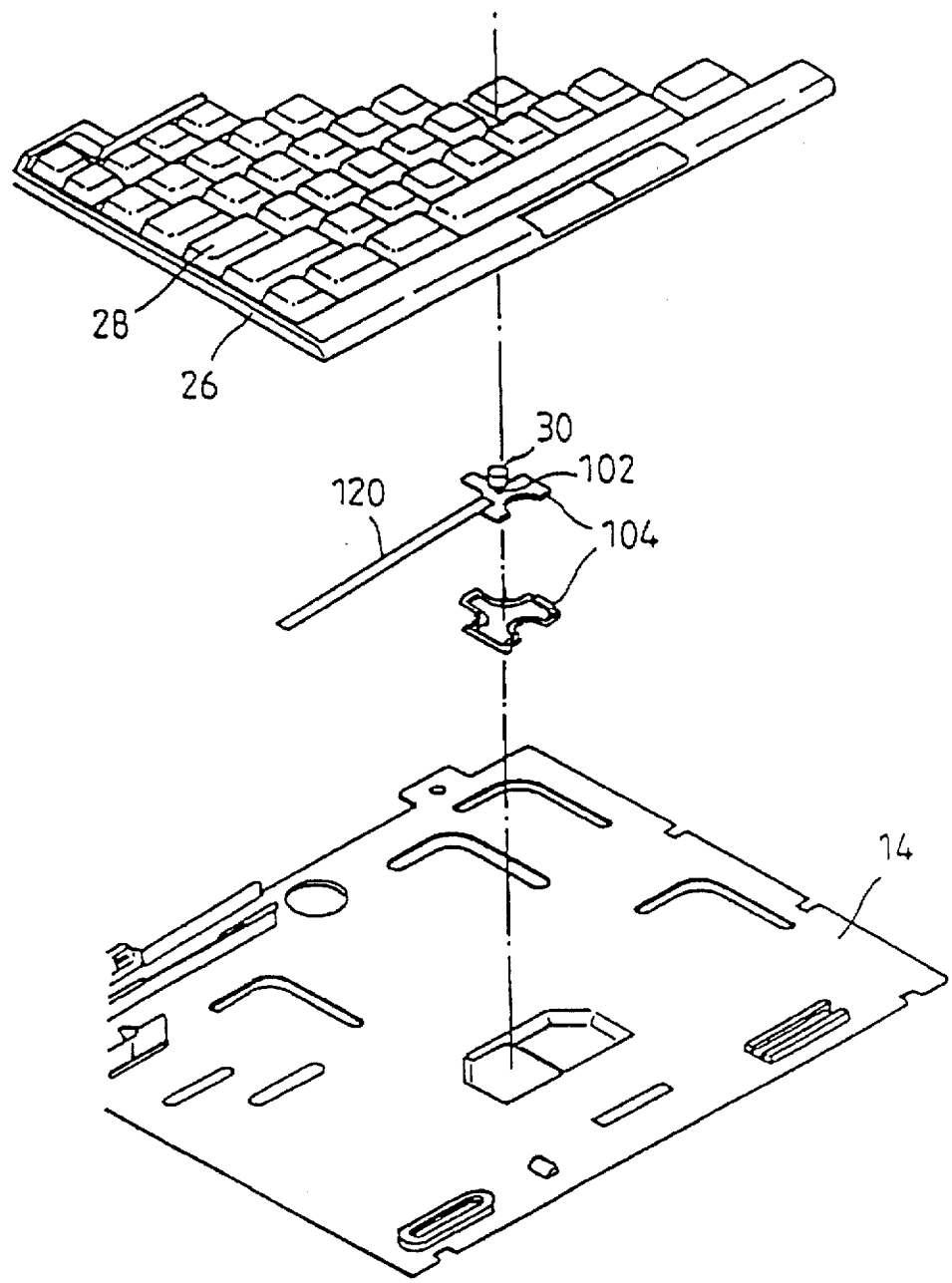
FIG. 8 is a perspective view of an elevating and lowering mechanism according to an additional embodiment of the present invention.

A second embodiment of the present invention will now be explained while referring to FIG. 8. The second embodiment is a replacement proposal for the first embodiment. The arm 110 shown in FIGS. 4 through 7 is replaced with a carrier 120 in FIG. 8. And while the base portion 104 of the pointing device 30 is connected to the keyboard side by means of the hinges 106 and 108 in the first embodiment, it is securely fixed to the carrier 120 in this second embodiment. As the base portion 104 is elevated and lowered along a slope that is formed for the lower case, the pointing device can be lifted and lowered. Grooves are formed in the keyboard 22 to move the pointing device 30. It is desirable that, taking its characteristic into account, the carrier 120 be made of a metal, such as stainless steel, that is flexible to a degree, or of a plastic.

Figure 9:
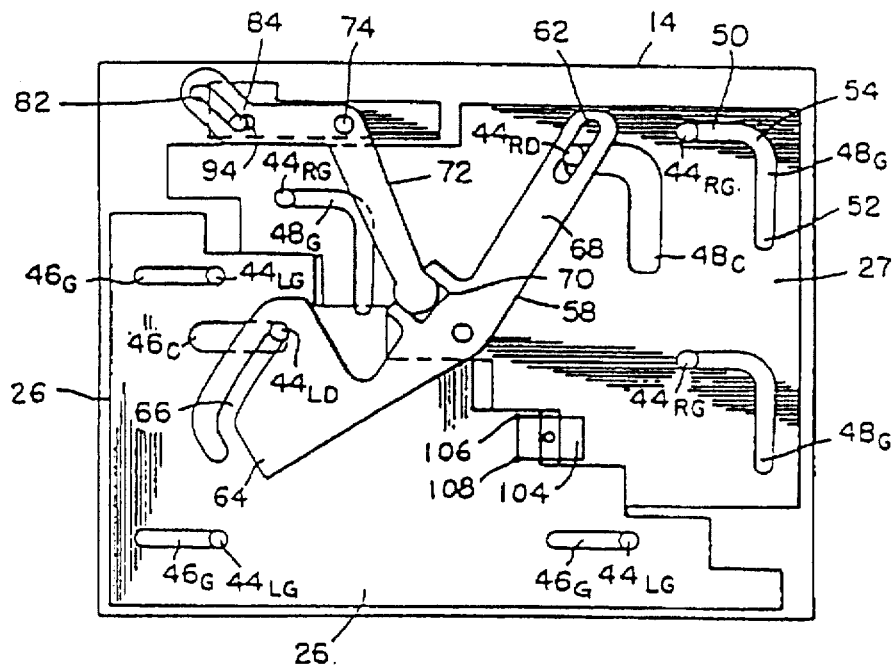
FIG. 9 is a schematic plan view of the portable PC in FIG. 3 with its cover closed.
Figure 10:
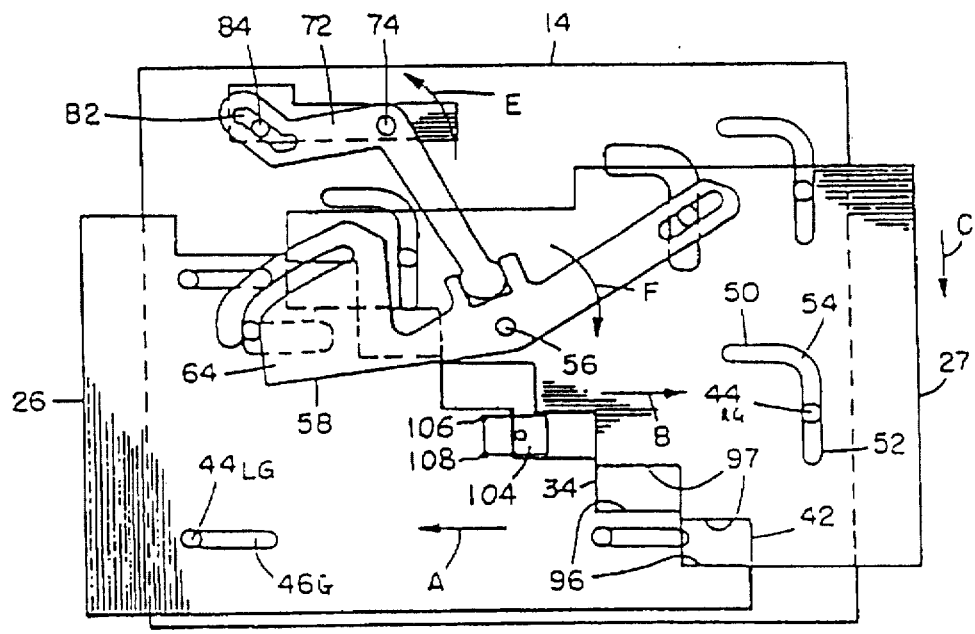
FIG. 10 is a schematic plan view of the operating mechanism for the portable PC in FIG. 3 with the cover partly opened.

A third embodiment will now be described while referring to FIGS. 9 through 12. FIGS. 9 and 10 are schematic diagrams illustrating a mechanism for shifting pallets 26 and 27, and an elevating and lowering mechanism for a pointing device that is related to the present invention. Japanese Patent Application No. Hei 6-324533 (Our company reference No. Y0994005), incorporated herein by reference, should be referred to for the description of the mechanism that moves the pallets 26 and 27. A mechanism in the computer 10 automatically controls the shifting of the pallets 26 and 27 between the storage positions and the operating positions in response to the positioning of the cover 16 on the base 14. When the cover 16 is closed, as is shown in FIG. 1, the pallets are retained in the storage position that is shown in FIG. 9. When the cover is opened a specific distance relative to the base, the pallets are shifted into the operating position, shown in FIG. 10.

Now, a shifting mechanism and the movement of the pallets from the storage position to the operating position will be described. In FIG. 9 is shown one part of the shifting mechanism when the pallets 26 and 27 are retracted into the storage position. The base portion 104, over which the pointing device 30 is fitted, is coupled to the left pallet 26 by hinges 106 and 108. In the storage position, a gap is defined between the left pallet 26 and the right pallet 27 for the operating section of the pointing device 30. The left pallet 26 has three guide pins 44LG that protrude downward from the bottom of a left plate 36 to prevent wobbling and that are fitted into guide slots 46G in the base 14. The left pallet 26 is also fitted around a drive pin 44LD that extends through a clearance slot 46C. The right pallet 27 has three guide pins 44RG that extend downward from the bottom of a right plate 37 to prevent wobbling. The guide pins 44RG can be so fitted into guide slots 48G in the base 14 that they are slidable, so that another type of pointing device can be provided. Such a pointing device can be moved outside the plane of the pallets 26 and 27.

The base portion 104, over which the pointing device is fitted, is connected to the left pallet 26 by means of the hinges 106 and 108. As is described above, the left pallet 26 is also fitted around the drive pin 44LD that extends through the clearance slot 46C, while the right pallet 27 has the three guide pins 44RG that extend downward from the bottom of the right plate 37 to prevent wobbling. The guide pins 44RG are so positioned in the guide slots 48G in the base 14 that they are slidable. The right pallet 27 is also fitted around a drive pin 44RD that extends through the clearance slot 48C. The guide slots 46G are elongated linearly in the horizontal direction A. The guide slots 48G are formed in an inverted L shape and have a first linearly elongated section 50 and a second linearly elongated section 52. The two sections 50 and 52 are connected to each other by a curved section 54.

The first section 50 is extended in the horizontal direction B, while the second section 52 is extended in the diagonally forward direction c, relative to the first section 50. Installed on the base 14 is a pivot pin 56 around which a first drive arm 58 is so fitted that it can be pivoted.

The first drive arm 58 has a first end portion 60, in which is formed a first guide slot 62, a second end portion 64, in which is formed a second guide slot 66, and a central connection area 68, in which is formed a socket area 70. The central connection area 68 is so fitted around the pivot pin 56 that it can be freely pivoted. The drive pin 44RD, which is installed on the right pallet 27, is so positioned in the first guide slot 62 that it is slidable. The drive pin 44LD, which is installed on the left pallet 26, is so positioned in the second guide slot 66 that it can be slidable. The first and second guide slots 62 and 66 are formed in an appropriate shape, so that in unison with the clearance slots 46C and 48C and the guide slots 46G and 48G they can provide a desired manipulation for the pallets 26 and 27 on the base 14.

The shifting mechanism includes the second drive arm 72, which is so fitted around the pivot 74, which is installed on the base 14, that it can be pivoted. At the extremities of the second drive arm 72 are the first end portion 76 and the second end portion 78. At the proximal end of the first end portion 76 is formed a ball section 80 that is inserted in a socket 70 that is formed in the first drive arm 58 so that it is set in the operating state. In the second end portion 78 is formed a cam slot 82, wherein a cam pin 84 is positioned. The cam pin 84 reduces the influence due to friction, and a roller (not shown) can be employed to provide smoother operation at the slot 82.

Referring to FIG. 13, the cam pin 84 is extended downward from a cam slider 86. The cam slider 86 is so installed in the base 14 in parallel to the rotary shaft of the cover 16 on the base 14 that it is slidable. The cam slider 86 is biased to the left by a tension spring 88. The cam slider 86 has a rider section 90 that contacts a cam surface 92 of the left pivot joint 24A (see FIG. 3), by which the cover 16 is attached to the base 14. When the cover 16 is to be pivoted to the closed from the opened position, the pivot 24A rotates as is indicted by the arrow D. Then, the cam surface 92 drives the rider section 90, the cam slider is shifted to the right, as is indicated by the arrow B, and the tension spring 88 is stretched. When the cover 16 is to be pivoted from the closed position to the opened position, the pivot 24A rotates in the direction opposite to that indicated by D. The tension spring 88 pulls the cam slider 86 in the direction that is opposite to that indicated by B, as the rider section 90 moves along the cam surface 92 to shift the keyboard into the operating position. The force that is provided for arranging the keyboard is only that force which is generated by the tension spring 88. This structure protects the internal mechanism when the extension of a pallet is interrupted. This arrangement is therefore preferable for driving the cam slider 86 directly into the cover at the extended operating position.

As is described above and shown in FIG. 9, the pallets 26 and 27 are retained in the storage position when the cover 16 is closed. In this condition, the cam slider 86 and the cam pin 84 are positioned completely to the right by the cam surface 92 of the pivot joint 24A, which acts on the rider section. FIG. 10 is a diagram that depicts the shifting mechanism when the cover 16 is opened. As is apparent from a comparison of FIG. 10 with FIG. 9, the cam pin 84 has been shifted to the left side. Thus, the second drive arm 72 has pivoted as is indicted by the arrow E because the center section of the cam slot 82 is formed as an angle. Since the pivot 74 is fixed to the base 14, the first end portion 76 of the second drive arm 72 causes the first drive arm 58 to rotate in the direction F. Due to the interaction of the guide pins 44LG and 44RG in the guide slots 46G and 48G, and the interaction of the first guide slot 62 and the second guide slot 66 for the first drive arm 58 with the drive pins 44LD and 44RD of the respective pallets, the left pallet 26 is driven by the first drive arm 58 in the horizontal direction that is indicated by A, and the right pallet 27 is driven by the first drive arm 58 in the horizontal direction B inversely.

Figure 11:
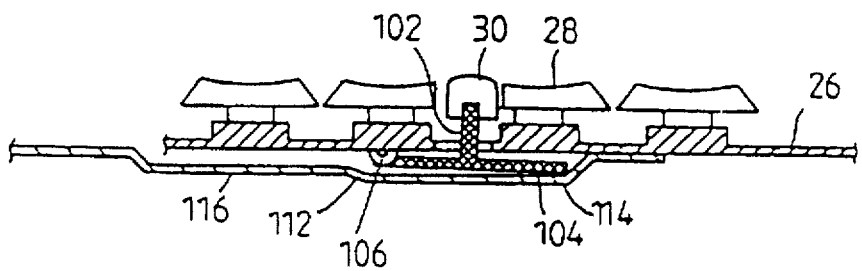
FIG. 11 is a cross sectional view of the pointing device actuating mechanism in the portable PC in FIG. 3 with the cover of the portable PC closed.
Figure 12:
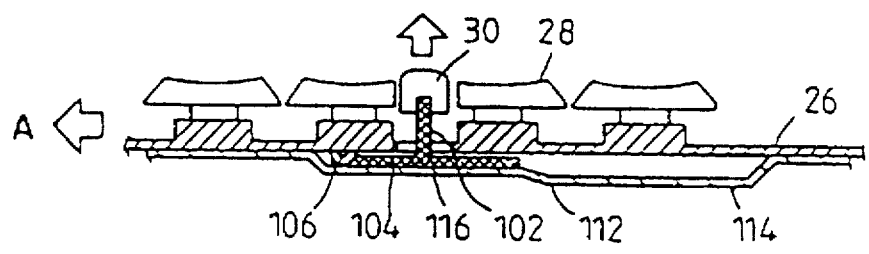
FIG. 12 is a cross sectional view of the pointing device actuating mechanism in the portable PC in FIG. 3 with the cover of the portable PC opened.

The base portion 104, which is connected to the left pallet 26 by means of the hinges 106 and 108, interacts with the left pallet 26 and is shifted in the horizontal direction A. As is shown in FIGS. 11 and 12, the base portion 104 is driven upward by the second shelf portion 116 across the slope portion 112 of the lower case 14, which extends from the first shelf portion 114 along the lower face of the base portion 104. As a result, the operating section of the pointing device 30 is raised. It is preferable that a positioner, such as a leaf spring, or an indentation that corresponds to the shape of the base portion 104, be provided for the second shelf portion 116 in order to prevent the pointing device 30 from wobbling while it is being manipulated.

The first drive arm 58 pivots around the pivot pin 56, and the ball section 80 of the second drive arm 72 pivots in the socket area 70 of the first drive arm 58. The shifting route of the pallets is specified by the guide slots 46G and 48G. Since at its center section the cam slot 82 is formed as an angle, the second pivot arm 72 is turned in the direction E, while the first drive arm 58 is turned farther in the direction F until the guide pins 44LG of the left pallet 26 arrive at the left ends of the guide slots 46G. Thus, the left pallet 26 is halted at the final, operating position for the keyboard assembly 22. The second end portion 64 of the first derive arm 58 is appropriately formed to maintain the left pallet 26 in this position even when the arm 58 is turned farther in the direction F. All of the guide pins 44RG of the right pallet 27, in response to the movement of the arm 58, travel from the first sections 50 of the guide slots 48G along the curved sections 54 into the second sections of the guide slots 48G. Therefore, the right pallet 27 is moved to its farthest outward position in the horizontal direction, and then begins to move forward in the direction that is indicated by C. The two pallets 26 and 27 are shifted sufficiently outward in the horizontal directions A and B, respectively, so that a front edge 97, at a Step shaped face 42 of the right pallet, is positioned over an edge 96, at a step shaped face 34 of the left pallet, which was previously adjacent to the edge 97. The right pallet 27 can move forward in the direction C with no interruption by the left pallet 26. A gap for the pointing device 30 is defined between the right and left pallets 27 and 26, as it is when they are in the closed position.

The right pallet 27 advances to the final operating position, and the step shape faces 34 and 42 engage each other. The pallets 26 and 27 are then in the operating position, as is shown in FIGS. 3 and 6. The cover 16 can be opened from the closed position to an angle of about 180° without moving the pallets 26 and 27. The shifting of the keyboard assembly 22 from its storage position to its operating position has been explained. To move the keyboard assembly 22 from the operating position to the storage position, a user merely closes the cover. The shifting mechanism automatically shifts the pallets 26 and 27 inversely. First, the right pallet 27 is retracted in the direction that is the opposite of the direction C, and then the two pallets 26 and 27 are moved horizontally toward each other. Following this, as is described in the first embodiment, the base portion 104 is moved to the first shelf portion 114 along the slope portion 112, and as a result, the operating section for the pointing device 30 is lowered.

Figure 14:
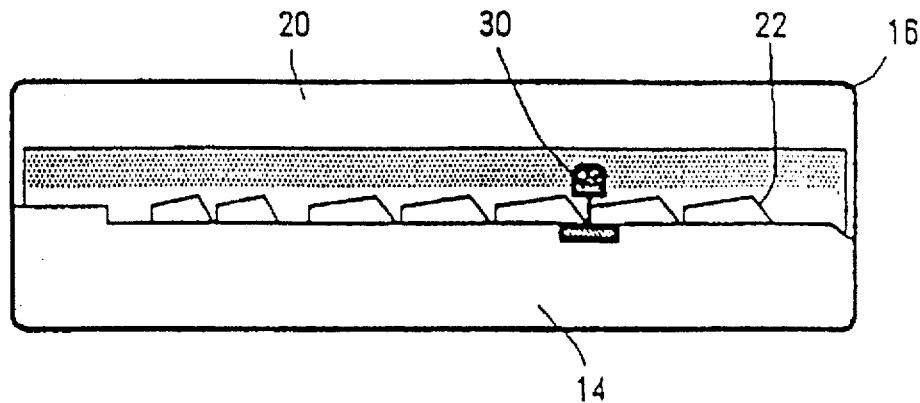
FIG. 14 is a cross sectional view of a conventional portable PC.
Figure 15:
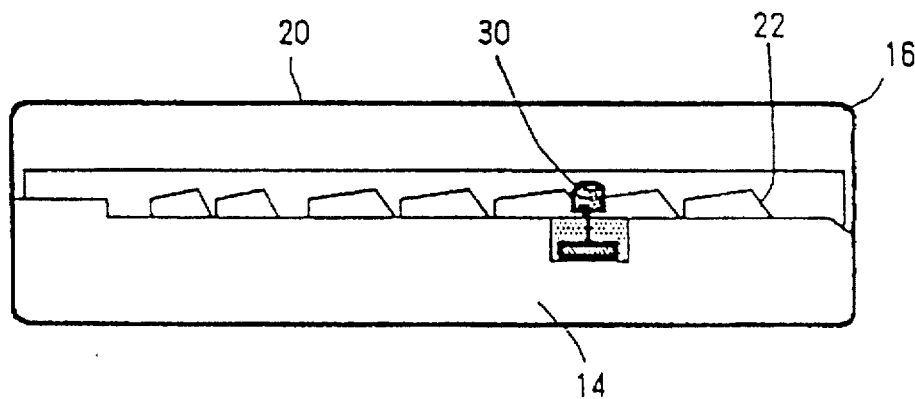
FIG. 15 is a cross sectional view of a portable PC according to the present invention.

As is described above, the volume of the unnecessary gap shown in FIG. 14 is about 125 cm$^3$ for a full-notebook PC type, such as a ThinkPad 755CX, and about 100 cm$^3$ for a sub-notebook PC type, such as a ThinkPad 701C. On the other hand, the volume of the unwanted gap shown in FIG. 15 is about 35 cm$^3$ (when the second embodiment is employed) for a full-notebook PC type, such as a ThinkPad 755CX, and about 10 cm$^3$ (when the third embodiment is employed) for a sub-notebook PC type, such as a ThinkPad 701C.

While a number of different illustrated examples of the present invention are explained, a number of modifications can be made without departing from the spirit and scope of the invention. For instance, the described mechanisms can be replaced with modified mechanisms of various shapes and types, such as electrically activated mechanisms. Further, the elevating and lowering mechanism that is related to the present invention can be also incorporated in keyboards of the other types of computers. In addition, components or materials of arbitrary sizes, shapes, and types can be employed. Therefore, it should be understood that the invention is not limited to the disclosed embodiments but should be construed in accordance with the spirit and scope of the accompanying claims.

What is claimed is:

1. A portable computer comprising:

a system body;

a cover attached by pivot joints to said system body so that it can be freely opened and closed;

a keyboard on the top face of said system body;

a pointing device having an operated end which pointing device is located among a plurality of input keys in the keyboard;

an elevating and lowering means for raising said operated end higher than said plurality of input keys when said portable computer is to be operated, and for lowering said operated end when the portable computer is not to be operated wherein said elevating and lowering means includes means which interacts with opening and closing of said cover to elevate and lower said operated end including:

a base portion supporting said pointing device, that is coupled to said keyboard by a hinge and secures a base end of said pointing device; and an arm portion means that moves in response to the opening and closing of the cover to elevate and lower said base portion.

2. A portable computer according to claim 1 wherein said means which interacts with the opening and closing of said cover includes cam means coupled to one of said pivot joints to drive the arm means in response to the opening and closing of said cover.

3. The portable computer of claim 2 including:

a) a cam on one of said pivot joints of the cover;

b) a spring loaded cam follower that moves laterally along the back edge of the system body as the cover is raised and lowered; and c) means coupling the arm portion means to the spring loaded cam follower to cause said means of the arm portion.

4. The portable computer of claim 3 wherein said arm portion means includes two interacting lever arms and a slide positioned under the base portion one lever arm coupled to said cam follower and the other lever arm coupled to said slide so that the base moves in response to the opening and closing of the cover to raise and lower the operated end of the pointing device.

5. The portable computer of claim 4 wherein
   a) each of the lever arms rotate around a pivot fixed to the base so that the arms rotate in planes parallel to one another; and
   b) said slide moves in a plane parallel to lever arms under the base portion to raise and lower the operated end of the pointing device.

6. The portable computer of claim 5 wherein a surface of the slide is canted relative to the parallel planes to cause the base portion to pivot on the hinge and move the operated end of the pointing device above and below the keys on the keyboard as the cover is opened and closed.

7. A portable computer comprising:
   a system body;
   a cover attached by pivot joints to said system body so that it can be freely opened and closed;
   a keyboard on the top face of said system body;
   a pointing device having an operated end which pointing device is located among a plurality of input keys in the keyboard; and
   an elevating and lowering means for raising said operated end higher than said plurality of input keys when said portable computer is to be operated and for lowering said operated end when the portable computer is not to be operated wherein said elevating and lowering means includes means which interacts with opening and closing of said cover to elevate and lower said operated end including:
   a carrier to which a base end of said pointing device is fixed;
   a sloped portion for supporting said carrier so that it can freely slide along the sloped portion; and
   interacting means for interacting with said opening and said closing of the cover to elevate and lower said carrier by movement along said sloped portion.

8. A portable computer according to claim 7 wherein said interacting means includes cam means coupled to one of said pivot joints.

9. The portable computer of claim 8 wherein said cam means includes:
   a) a cam on one of said pivot joints of the cover;
   b) a spring loaded cam follower that moves laterally along the back edge of the system body as the cover is raised and lowered.

10. The portable computer of claim 9 wherein said interacting means includes two interacting lever arm means and a slide that contains said sloped portion, one of said lever arms coupled to said cam follower and the other of the lever arms coupled to said slide to move the sloped portion under the carrier to raise and lower the operated end of the pointing device above and below the keys on the keyboard as the cover is opened and closed.

11. The portable computer of claim 10 wherein
   a) each of the lever arms rotate around a pivot fixed to the base so that the arms rotate in planes parallel to one another; and
   b) said slide moves parallel to lever arms under the base portion to move it into and out of its functioning position.

12. A portable computer comprising:
   a system body;
   a cover attached by pivot points to said system body so that it can be freely opened and closed;
   a keyboard on the top face of said system body which keyboard is divided into a plurality of keyboard sections that shift into and out of their functioning position;
   a pointing device having an operated end is locating among a plurality of input keys in the keyboard;
   an elevating and lowering means for raising said operated end higher than said plurality of input keys when said portable computer is to be operated, and for lowering said operating end when the portable computer is not to be operated wherein said elevating and lowering means includes means which interacts with opening and closing of said cover to elevate and lower said operated end including:
   a base portion that is coupled with one of said plurality of keyboard sections by a hinge and secures a base end of a pointing device; and
   a sloped portion for supporting said base portion so that it can freely slide along the sloped portion, wherein said base portion interacts with a movement of said keyboard section and is elevated and lowered by movement along said sloped portion.

* * * * *